United States Patent [19]

Ippolito et al.

[11] Patent Number: 4,488,224
[45] Date of Patent: Dec. 11, 1984

[54] SYSTEM FOR CONTROLLING DATA FLOW

[75] Inventors: Stephen J. Ippolito, Concord; Arthur L. Singer, Lexington; William J. Lambert, Westford, all of Mass.

[73] Assignee: IPL Systems, Inc., Waltham, Mass.

[21] Appl. No.: 406,775

[22] Filed: Aug. 10, 1982

[51] Int. Cl.³ .......................... G06F 7/00; G06F 9/22
[52] U.S. Cl. ..................................................... 364/200
[58] Field of Search ... 364/200 MS File, 900 MS File

[56] References Cited

U.S. PATENT DOCUMENTS

3,805,247 4/1974 Zucker et al. ...................... 364/200
4,433,377 2/1984 Eustis et al. ....................... 364/200
4,434,459 2/1984 Wallach et al. .................... 364/200

Primary Examiner—Harvey E. Springborn
Attorney, Agent, or Firm—Schiller & Pandiscio

[57] ABSTRACT

A control system is described for controlling the flow of multi-format, multi-bit macroinstructions for loading data into registers. The control system is adapted to: (A) control microprogram flow of instructions based on data within a floating point macroinstruction, (B) speed up macroinstruction flow as a function of data within various fields of the macroinstruction, and (C) speed up macroinstruction branches.

11 Claims, 6 Drawing Figures

```
RR Format          OP CODE       R1        R2
(2 BYTE OP)
00XX XXXX          0-7           8-11      12-15
A register is set to the contents of GP(R2).
```

---

```
RX Format          OP CODE       R1        X2        B2        D2
(4BYTE OP)
01XX XXXX          0-7           8-11      12-15     16-19     20-31
A register is set as follows:
    X2 = 0, B2 = 0        Set A reg to zero's.
    X2 = 0, B2 ≠ 0        Set A reg to contents of GP(B2).
    X2 ≠ 0, B2 = 0        Set A reg to contents of GP(X2).
    X2 ≠ 0, B2 ≠ 0        Set A reg to contents of GP(X2).
```

---

```
RS Format          OP CODE       R1        R3        B2        D2
(4 BYTE OP)
10XX XXXX          0-7           8-11      12-15     16-19     20-31
If B2=zero then the A register is set to zero's.
Otherwise, the A register is set to the contents of GP(B2).
```

---

```
SI Format          OP CODE       I2        B1        D1
(4 BYTE OP)
10XX XXXX          0-7           8-15      16-19     20-31
If B1=zero then the A register is set to zero's.
Otherwise, the A register is set to the contents of GP(B1).
```

---

```
S  Format          OP CODE       B2        D2
(4 BYTE OP)
10XX XXXX          0-15          16-19     20-31
If B2=zero then the A register is set to zero's.
Otherwise, the A register is set to the contents of GP(B2).
```

---

```
SS Format          OP CODE       L1        L2        B1        D1        B2        D2
(6 BYTE OP)
11XX XXXX          0-7           8-11      12-15     16-19     20-31     32-35     36-47
If B1=zero then the A register is set to zero's.
Otherwise, the A register is set to the contents of GP(B1).
If B2=zero then the A register is set to zero's.
Otherwise, the A register is set to the contents of GP(B2).
```

SYSTEM FOR CONTROLLING DATA FLOW

The present invention relates generally to systems for controlling the flow of binary signal information, and more particularly to a high speed control system adapted to control the flow of multiformat, multi-bit macroinstructions for loading data into registers.

Multi-bit instructions for loading data into registers of a computer system can, of course, be presented in several different formats within the same system. Provisions, therefore, must be made within the computer system to process each format. For example, the IPL Model No. 1 (also known as the Omega Model No. 1), the IPL Model No. 2 (also known as the Omega Model No. 2), the IPL 4443, and the IPL 4436 (also known as the Omega No. 3), each manufactured and sold by IPL Systems, Inc. of Waltham, Mass. (the assignee of the present invention), and hereinafter collectively referred to as the "IPL System", are each adapted to distinguish and process at least six different formats, each consisting of either 16, 32 or 48 bits of information. The precise format can determine how the information is processed by the system and, in particular, how information is loaded into registers of the system. This will be more apparent from a discussion of the "Macroinstruction and the A Register Conditional Loading Table" provided for this system and shown in FIG. 1 of the drawings.

Figure 1:
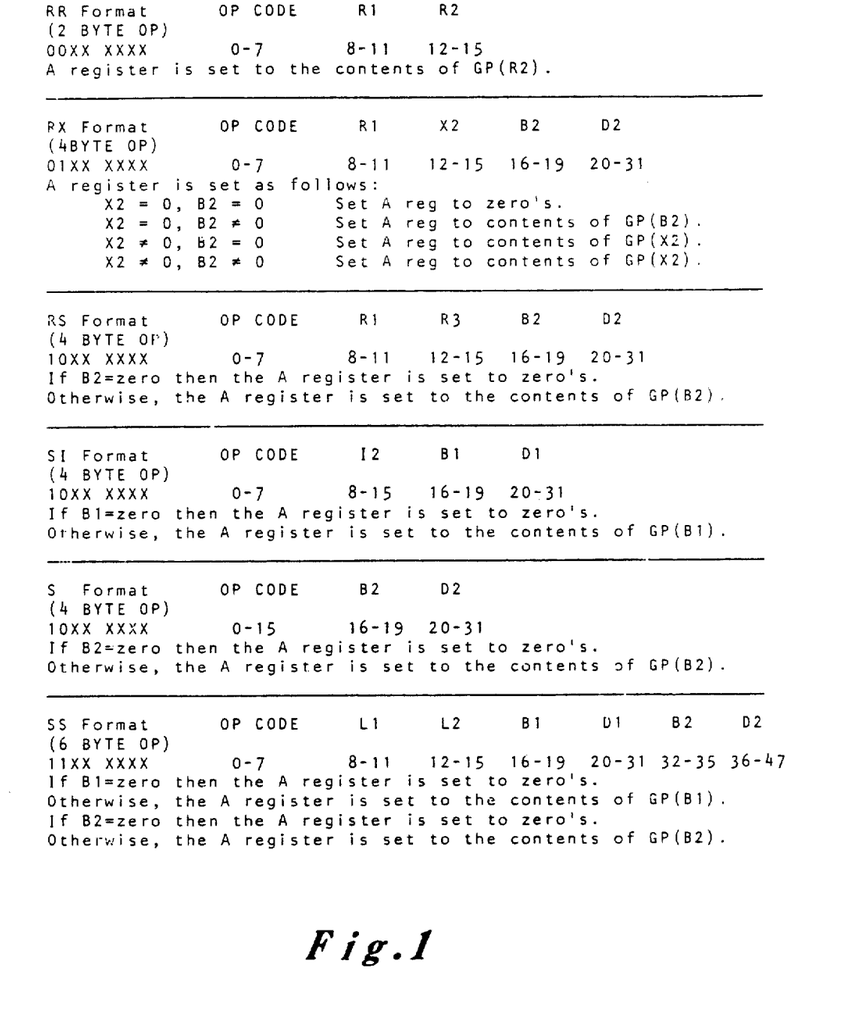
FIG. 1 is a macroinstruction and register conditional loading table previously described with respect to the background of the present invention.

As shown in FIG. 1 the macroinstructions of each format are described as follows:

(A) The RR format includes 16 bits of information and forms a two byte instruction. The first eight bits of information (bits 0–7) form the operation code of which the first two, each in the form of a low or logic zero level signal, define the format. The R1 field is defined by the 8–11 bits, while the R2 field is defined by the 12–15 bits. The 4-bit address of each of the R1 and R2 fields constitutes the address of a general purpose register, which can be denoted respectively as GP(R1) and GP(R2). When the macroinstruction is provided in the RR format the "A" register (a 32 bit register used in the IPL System by the microprogram) is loaded or set with the contents of GP(R2). The particular contents of GP(R2) is typically set by the microprogram.

(B) The RX format includes 32 bits of information and forms a four byte instruction. The first eight bits of information form the operation code of which the first two, in the respective form of a low or logic zero level signal and a high or logic one level signal, define the format. The R1 field is defined by the 8–11 bits (representing the 4-bit address of GP(R1)), the X2 field is defined by the 12–15 bits (representing the 4-bit address of GP(X2)), the B2 field is defined by the 16–19 bits (representing the 4-bit address of GP(B2)) and the 12 bits constituting the D2 field (bits 20–31) are the "displacement value" to be added to the contents of the specified general purpose register or registers to create a new main storage address. In the following control steps where the contents of a particular general purpose register is transferred to the A register the contents are typically provided in the general purpose register by the microprogram prior to the transfer of the data to the A register.

(1) When the 4-bits of the X2 field of the RX format signal are all low or logic zero level signals and similarly the 4-bits of the B2 field are all low or logic zero level signals, the A register is set to all zeros.

(2) When the bits of the X2 field of the RX format signal are all low signals, while the bits of the B2 field contain one or more high signals, the A register of the system is set to the contents of GP(B2) having the address designated in the B2 field.

(3) When the bits of the X2 field of the RX format signal contain one or more high signals, and all of the bits of the B2 field are low, the A register is set to the contents of GP(X2) having the address designated in the X2 field.

(4) Finally, when the bits of each of the X2 and B2 fields contain one or more high signals, the A register is set to the contents of GP(X2) having the address specified in the X2 field.

(C) The RS format includes 32 bits of information and also forms a four byte instruction. The first eight bits of information (bits 0–7) form the operation code of which the first two, a high and a low signal respectively define, in part, the format. In this four-byte format, the R1 field is defined by bits 8–11 (representing the address of GP(R1)), the R3 field is defined by bits 12–15 (representing the address of GP(R3)), the B2 field is defined by bits 16–19 (representing the address of GP(B2)), while the D2 field is defined by bits 20–31 (representing the displacement value to be added to the contents of the specified general purpose register or registers to create a new main storage address). In this format if the B2 field contains all low signals then the A register is set to zeros. If, however, the B2 field contains one or more high signals, the A register is set to the contents of GP(B2) having the address designated in the B2 field.

(D) The SI format is similar to the RS format since it includes 32 bits of information and also forms a four byte instruction. Additionally, the first eight bits of information (bits 0–7) form the operation code of which the first two, a high and a low signal respectively, define in part the SI format. However, in this format the I2 field is defined by bits 8–15 (representing the address of GP(I2)), the B1 field by bits 16–19 (representing the address of GP(B1)), and the D1 field by bits 20–31 (representing the displacement value to be added to the contents of the specified general purpose register or registers to create a new main storage address). In the SI format, if all of the bits of the B1 field are low then the A register is set to all zeros. Otherwise, the A register is set by the contents of GP(B1) having the address designated in the B1 field.

(E) The S format also includes 32 bits of information, and forms a four byte instruction. However, the operation code consists of the first sixteen bits, with the first two as a high and a low signal, respectively. Bits 16–19 define the B2 field (representing the address of GP(B2)) and the remaining bits 20–31 define D2 (representing the displacement value as described above with respect to the RS format). If all of the bits of the B2 field are low, then the A register is set to all zeros. Otherwise, the A register is set by the contents of GP(B2) having the address designated in the B2 field.

(F) The SS format includes 48 bits of information and forms a 6 byte instruction. The operation code consists of the first eight bits, bits 0–7, with the first two bits each a high signal. Bits 8–11 define the L1 field (representing the address of GP (L1)), bits 12–15 define the L2 field (representing the address of GP(L2)), bits 16–19 define the B1 field (representing the address of GP(B1)), bits 20–31 define the D1 field (representing the D1 displacement value as defined in the SI format), bits 32–35 define the B2 field (representing the address of GP(B2)), and bits 36–47 define the D2 field (representing the D2 displacement value as defined in the RX, RS, and S formats). In this format the 32 bit A register is presented with the instruction as two words, the first containing bits 0–31 and the second bits 32–47. When the first word is presented, if the B1 field (bits 16–19) contains all low signals the A register is set to zeros. Otherwise, the A register is set to the contents of GP(B1) having its address designated in the B1 field. When the second word is presented, if the bits of the B2 field (bits 32–35) are all low then the A register is set to all zeros. Otherwise, the A register is set to the contents of GP(B2) having its address designated in the B2 field.

Generally, using the above-noted formats, floating point instructions are provided when the operation code is represented by the binary designations 20 through 3F and 60 through 7F. As well known 4-bit binary numbers which number from 0–15, can be designated in binary form, i.e., 0000, 0001, 0010, 0011, etc., or alternatively they can be represented by the arabic numbers 0–9 corresponding to the same numbers, and the letters A, B, C, D, E and F corresponding to the arabic numbers 10–15, respectively. Thus, designations 20, 3F, 60 and 7F, each denote 2 four-bit numbers of the type as generally shown in Table I under each format. In the binary designation 20 the digit 2 represents the binary number two in the first 4-bit number, or 0010, while the digit 0 represents the binary number 0 as the second 4-bit number, or 0000. Similarly, in the binary designation 3F, the digit 3 represents the binary number 3 as the first 4-bit number, or 0011, while the letter F represents the binary number 15 as the second 4-bit number, or 1111. Thus, the designation 60 corresponds to the two 4-bit numbers 0110 0000, and the designation 7F corresponds to the two 4-bit numbers 0111 1111. By definition the operation codes 20 through 3F are in the RR format, while the 60 through 7F codes are in the RX format. As a result the floating point instructions provided by operation codes 20–3F will cause an error, or more accurately a "specification exception", if the wrong floating point register address or addresses are specified in the R1 field (bits 8–11) and/or the R2 field (bits 12–15). Similarly, the floating point instructions provided by operation codes 60–7F will cause a specification exception if the wrong floating point register address is specified in the R1 field (bits 8–11). Accordingly, in the prior art IPL System microcode is used to make a comparison of the relevant fields to determine whether an error has occurred or not. If there is no error the code branches to a routine to start actual execution of the instructions. This microcode comparison technique consumes a relatively large amount of time before the start of the execution of the program.

Accordingly, one object of the present invention is to more quickly control microprogram flow based on data within a floating point macroinstruction without resorting to the use of microcode to make the comparison of relevant fields.

In another operation of the prior art IPL System, referred to by the manufacturer as "RIF", an instruction is previously provided in an instruction buffer from an instruction cache, which in turn is fed information from the main memory of the machine. During the RIF operation, the instructions in the buffer are read into the "B" register of the system (the B register is also a 32 bit register used in the IPL System by the microprogram). The microcode then loads the contents of a specified general purpose register (the particular general purpose register depending upon the format utilized) into the A register of the temporary memory. The microcode also carries out a test to determine whether the address of the specified general purpose register is all zeros, i.e., GP(0), a condition which requires special treatment. If the condition of GP(0) exists, the microprogram branches to a routine to handle this special condition. This testing process of course takes a relatively long time regardless of whether the condition GP(0) exists.

It, therefore, is another object of the present invention to speed up macroinstruction flow by assisting the flow of the microprogram based on the data within various fields of the macroinstruction.

Another aspect of the prior art IPL System is the manner in which it processes two very similar types of micro-branch instructions. One, is of the RR format and has (A) an operation code of 07 or 0000 0111, (B) a select one of its bits of the R1 field (at bits 8–11) at a predetermined binary state which must match a preselected condition code set by system memory, and (C) the appropriate address code in the R2 field (bits 12–15). This instruction will cause a branch to GP(R2), whose address is specified in the R2 field, if the binary value of the select bit contained in the R1 field equals a preset condition code set by system memory. However, if the R2 field contains all low signals then no branch is performed. The other branch instruction is of the RX format having (A) an operation code of 47 or 0100 0111, (B) a select one of the bits of the R1 field (bits 8–11) at a predetermined binary state which must match the preset condition code set by system memory, (C) the appropriate address of GP(X2) and GP(B2) respectively at bits 12–15 and 16–19, and (D) the displacement value D2 at bits 20–31. If the select bit provided in the R1 field is at the binary state so as to equal the condition code, this instruction causes the branch to the address specified by the addition of the contents of GP(X2)+GP(B2)+D2 (the latter being a displacement value). Thus, in the prior art IPL System when either of these two instructions occur, the microcode reads the instruction into the B register of the machine. After the RIF cycle is complete, the program branches to a specific address depending on the operation code. The microcode then checks the branch conditions. If there is no macroinstruction branch, then the microprogram calculates the new address and issues a separate operation, which the manufacturer refers to as the BUSR operation and which initiates the branch.

It is yet another object of the present invention to more quickly process these branch instructions.

As will be more evident hereinafter, these and other objects are achieved by an improved system for controlling the flow of data to a register. In accordance with one aspect of the present invention a system is provided for generating a specification error signal in response to a predetermined type of instruction in at one preselected format containing (i) an operation code of at least two binary bits of information, the binary state of at least one of which indicates the instruction is of the predetermined type, and (ii) at least one field of at least two binary bits of information, the binary states of which determine whether a specification exception exists in the instruction. The system comprises discriminator means for generating a first enabling signal in response to an instruction when the instruction is in the preselected format. The discriminator means comprises (1) means for detecting and discriminating between instructions in the preselected format and instructions in other formats, and (2) means for generating the first enabling signal when the instruction is in the preselected format. The system also includes means for generating a second enabling signal in response to the binary state of the at least one bit of the operation code indicating the instruction is of the predetermined type; and means for generating the specification exception signal in response to (a) the first enabling signal, (b) the second enabling signal; and (c) a predetermined binary state of each of the bits of the at least one field of the instruction.

In accordance with another aspect of the present invention a system is provided for generating a plurality of binary bits of data adapted to be used for controlling the flow of information to a register. The plurality of binary bits of data are contained within at least one field of an instruction of at least four different formats and the register is cleared when the binary states of the bits of data within the one field of at least some of the formats are each at a corresponding predetermined level. An instruction in each of the formats is of the type comprising an operation code including at least two binary bits of information, the combined binary states of the two bits being a function of the format of the instruction. The instructions in three of the formats each comprise at least one field of at least two of said binary bits of data and an instruction in the fourth of the formats comprises at least two fields each of at least two of said binary bits of data. The system comprises signal discriminator means responsive to the two bits of information of the operation code of an instruction for selectively generating at least four distinct format signals, each as a function of a different combination of the binary states of the two bits of information of the operation code so as to represent a select and different one of the formats. The system also comprises multiplexer means for transmitting: (1) the bits of data within the one field of an instruction in a first one of the three formats in response to a first one of the format signals representative of one of the three formats; (2) the bits of data within the first of the two fields of an instruction in the fourth format in response to either one of a first select signal and a second select signal; (3) the bits of data within the second of the two fields of an instruction in the fourth format in response to the absence of each of the first format signal, the first select signal and the second select signal; (4) the bits of data within the one field of an instruction in the second one of the three formats in response to the absence of each of the first format signal, first select signal and second select signal; and (5) the bits of data within the one field of an instruction in the third one of the three formats in response to the absence of each of the first format signal, first select signal and second select signal. Decoding means responsive to the fourth format signal representative of an instruction in the fourth format is provided for generating: (1) a first clear signal for clearing the register when the bits of the data of each of the first and second fields of an instruction in the fourth format are each at the corresponding predetermined level, (2) the first select signal when only the bits of the data of the first field of an instruction in the fourth format are each at the corresponding predetermined level, and (3) the second select signal when at least one of the bits of the data of each of the first and second fields of an instruction in the fourth format differ from the corresponding predetermined level. The system also comprises means responsive to the second format signal for generating a second clear signal so as to clear the register when the bits of the data of the one field of an instruction in the second format are each at the corresponding predetermined level; and means responsive to the third format signal for generating a third clear signal so as to clear the register when the bits of the data of the one field of an instruction of the third format are each at the corresponding predetermined level.

In accordance with another aspect of the present invention a system is provided for generating an instruction initiation signal for initiating a first instruction operation and for blocking a second instruction operation in response to at least one instruction comprising (1) an operation code of a plurality of binary bits of information, each bit being at a predetermined binary level, and (2) at least one field of data comprising a plurality of binary bits, the binary state of at least a select one of the bitsbeing equal to a preselected condition code when at a preselected binary level. The system comprises means for generating an enabling signal in response to the operation code when the plurality of binary bits of the operation code are each at its predetermined binary level. Means are also provided for generating a condition code input signal representative of the preselected condition code. The system also comprises multiplexer means responsive to the condition code input signal for selectively transmitting the select one of the binary bits, and means for generating the instruction initiation signal for initiating the instruction operation in response to (a) the enabling signal and (b) the select one of the binary bits when the select bit is at the preselected binary level.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings where.

Figure 2:
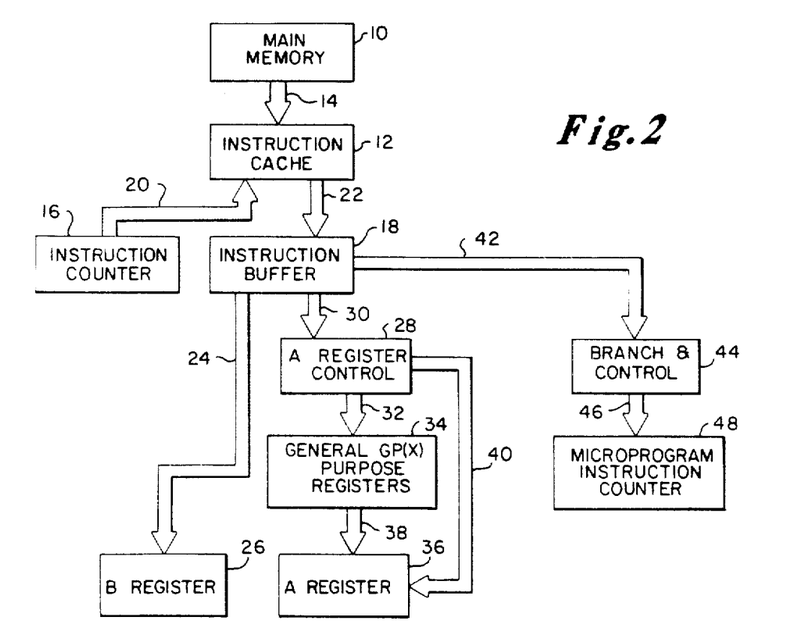
FIG. 2 is a block diagram of the computer system which incorporates various aspects of the present invention.

Referring to the drawings, wherein the same numerals are used to designate like parts, the block diagram shown in FIG. 2 depicts a typical system, such as the prior art IPL System, and further incorporating the principles of the present invention. More particularly, the system includes main memory 10 which communicates with instruction cache 12 over data bus 14. Cache 12 is addressed by an instruction over address bus 20, and transmits information to buffer 18 over bus 20. Buffer 18 is connected through and transmits information over bus 24 to B register 26. In accordance with the present invention register loading control system 28 is utilized to control information flow from the general purpose registers, indicated generally at 34, to the A register 36. Specifically, control information is transmitted over control lines 30 to control system 28, which in turn addresses the general purpose registers 34 over address bus 32 so that data can be transferred from the general purpose registers 34 over data bus 38 to the A register 36. Additionally, under certain circumstances, as will be apparent hereinafter, control system 28 can zero A register 36 via control line 40. In the prior art IPL System the A register is a 32 bit register. In addition branching instructions are transmitted over data bus 42 to the branch and control system 44 which in turn controls over bus 46 the microprogram instruction counter 48.

The preferred control system 28 and branch and control system 44 of the present invention, shown in detail in FIGS. 3-6, are adapted to (A) control microprogram flow of instructions based on data within a floating point macroinstruction, (B) speed up macroinstruction flow as a function of data within various fields of the macroinstruction; and (C) speed up macroinstruction branches.

In order to perform the foregoing the preferred embodiment of systems 28 and 44 include the detailed structure shown in FIGS. 3-6. Each system 28 and 44 includes a signal format discriminator, indicated at 100 in FIG. 3, for determining the type of format of the bit instruction received by the system 28 over data transfer bus 30 from instruction buffer 18. Discriminator 100 includes two input terminals 102 and 104 for respectively receiving the first two bits IB00 and IB01 of any instruction. Input terminal 102 is connected directly to the output terminal 106 for providing the IB00 output signal. Input terminal 102 is also connected to an input of each of the OR gate 108, AND gate 110, and inverter 112, the latter in turn having its output connected to an input of each of the NOR gate 114 and AND gate 116. The input terminal 104 is connected to another input of each of the OR gate 108, AND gate 110, NOR gate 114 and AND gate 116, and directly to the output terminal 118 for providing the IB01 output signal. The output of OR gate 108 is connected to inverter 120, which in turn has its output connected to output terminal 122 for providing the output signal 2 BYTE OP representative of the RR format. The outputs of gates 110, 114, and 116 are connected to the corresponding output terminals 124, 126, and 128 for respectively providing the output signal 6 BYTE OP representative of the SS format, the output signal OP=10 representative of instructions having the first two bits of its operation code equal to 10 (and, therefore, of the RS, SI or S format), and the output signal OP=01 representative of instructions having the first two bits of its operation code equal to 01 (and, therefore, of the RX format).

Figure 4:
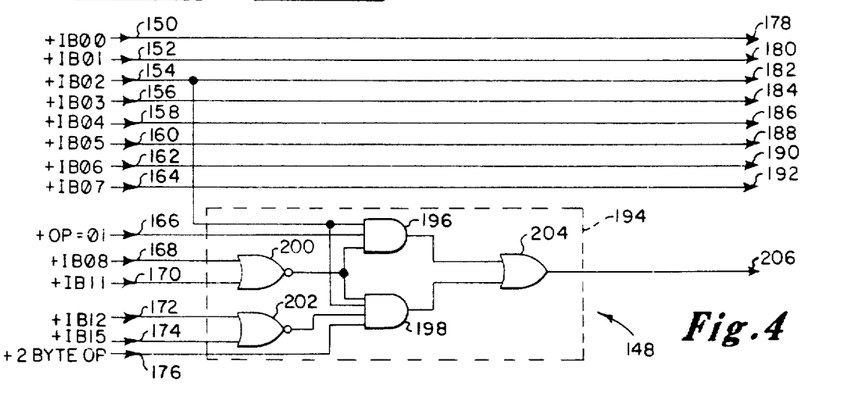
FIG. 4 is a logic diagram of another portion of the preferred embodiment of the register loading control system of the present invention, including circuitry for recognizing specification exceptions.

Referring now to FIG. 4 in order to more quickly control microprogram flow based on data within a floating point macroinstructions without resorting to the use of microcode to make the comparison of relevant fields, it is necessary to detect and distinguish floating point instructions from other types. Floating point instructions are provided when the operation code is represented by the binary designations 20 through 3F and 60 through 7F. This latter condition exists when the instruction is either of the RR format or the RX format. The floating point instructions provided by the 20-3F operation code (RR format instruction) will cause a specification exception if the wrong floating point register address or addresses are specified in the R1 field (bits 8-11) and in the R2 field (bits 12-15). Similarly, the floating point instructions provided by operation codes 60-7F (RX format) will cause a specification exception if the wrong floating point register address is specified in the R1 field (bits 8-11).

Accordingly, the preferred means for quickly controlling the microprogram flow based on data within floating point macroinstructions includes the signal format discriminator 100 (of FIG. 3) for detecting when the instruction is of the RR or RX format, and means 148 for determining the nature of the specification exception and for providing a unique address depending on whether a specification exception is present. Means 148 includes input terminals 150, 152, 154, 156, 158, 160, 162, 164, 166, 168, 170, 172, 174, and 176. Input terminals 150-164 respectively receive the first eight bits of the instruction, IB00-IB07. Input terminal 166 receives the OP=01 signal when present at the output 128 of signal format discriminator 100 of FIG. 3. Input terminals 168, 170, 172, and 174 respectively receive the ninth, twelfth, thirteenth and sixteenth bits of the instruction, IB08, IB11, IB12 and IB15. Finally, input terminal 176 receives the 2 BYTE OP signal from output terminal 122 of signal format discriminator 100 of FIG. 3. The input terminals 150-164 are respectively connected to the output terminals 178-192 so as to provide the first eight bits of the unique address at the output of means 148. Input terminals 166-176, as well as input terminal 154 are connected to an input of each of the AND gates 196 and 198 of the means 194 for determining the nature of the specification exception if such exception exists when the instruction is of the RX format or RR format. Input terminal 166 is connected to an input of AND gate 196, while input terminals 168 and 170 are respectively connected to the two inputs of NOR gate 200, and input terminals 172 and 174 are respectively connected to the two inputs of NOR gate 202. Input terminal 176 is connected to an input of AND gate 198. The output of NOR gate 200 is connected to an input of each AND gate 196 and 198, while the output of NOR gate 202 is connected to yet another input of AND gate 198. The two outputs of NOR gates 196 and 198 are respectively connected to the two inputs of OR gate 204.

Figure 5:
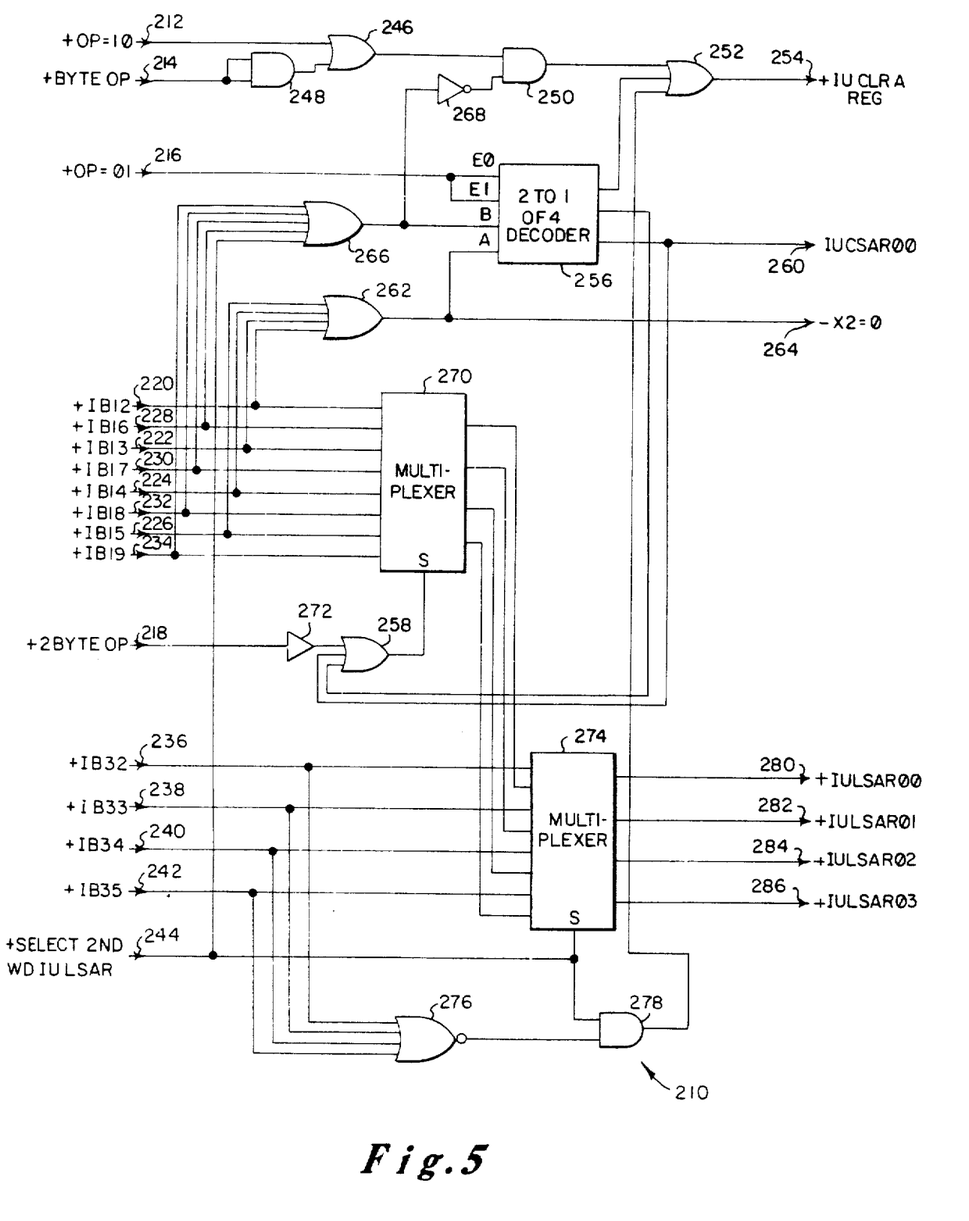
FIG. 5 is a logic diagram of still another portion of the preferred embodiment of the register including control circuitry for quickly clearing the A register if the designated general purpose register is GP(0)

Means shown in FIG. 5, are also provided for quickly determining, during the RIF operation, whether the address of the specified general purpose register is zero (as specified in the Table of FIG. 1) so that the A register 36 of FIG. 2 can be cleared, i.e., reloaded with all zeros. A register 36 is set to zero when:

(A) the instruction is of the RR format and the bits of the R2 field (bits 12-15) are all low;

(B) the instruction is of the RX format and the bits in the X2 field (bits 12-15) and the B2 field (bits 16-19) are all low;

(C) the instruction is of the RS, SI or S format and the bits in the B2 field in the case of the RS and S formats (bits 16-19) are all low, and the bits of the B1 field in the case of the SI format (bits 16-19) are all low; and (D) the instruction is of the SS format and the bits of the B2 field (bits 32-35) are all low.

The preferred system for accomplishing the foregoing includes the discriminator 100, as well as the circuit 210 shown in FIG. 5. Circuit 210 includes input terminals 212, 214, 216 and 218 for respectively receiving the OP=10, 6 BYTE OP, OP=01 and the 2 BYTE OP signals from the corresponding output terminals 126, 124, 128 and 122 of discriminator 100 of FIG. 3. Input terminals 220, 222, 224, 226, 228, 230, 232, and 234 respectively receive bits 13-20 of the instruction (signals IB12-IB19). Finally, input terminals 236, 238, 240, and 242 respectively receive bits 33-36 (signals IB32-IB35) and input 244 receives a special bit signal SELECT 2ND WD IULSAR when the instruction is of the 48 bit SS format type. Input terminal 212 is connected to an input of OR gate 246, while input terminal 214 is connected to the inputs of AND gate 248 (functioning as a buffer), which in turn has its output connected to the second input of OR gate 246. The output of OR gate 246 is connected to one input of AND gate 250, the latter having its output connected to one input of OR gate 252. The output terminal 254 of OR gate 252 provides the output signal IU CLR A REG signal for clearing the A register 36 so as to provide all zeros in the A register. Input terminal 216 is connected to the enable inputs of a 2 to 1 of 4 decoder 256. When enabled by a high signal at its enable input terminal, decoder 256 provides a high output signal at its phi-0 output when the input signals at the A and B input terminals are both low, a high output signal at its phi-2 output when its A input is high and its B input is low, and a high output signal at its phi-3 output when both its inputs at its A and B terminals are both high. Decoder 256 has its phi-0 output connected to a second input of OR gate 252, its phi-2 output connected to one input of OR gate 258, and its phi-3 output connected to a second input of OR gate 258 and the output terminal 260, the latter for providing the output signal IU CSAR 00.

Input terminals 220, 222, 224 and 226 are connected to respective inputs of OR gate 262. The latter has its output connected to the A input of decoder 256 and directly to the output terminal 264 for providing the X2 output signal. The latter is zero when the bits in the X2 field of an RX format signal are all zero.

Input terminals 228, 230, 232 and 234 are respectively connected to four of the five inputs of OR gate 266, the latter having its output connected to both the B input of decoder 256 and the input of inverter 268. The latter has its output connected to an input of AND gate 250. Input terminals 220-234 are also connected to respective inputs of multiplexer 270.

Input terminal 218 is connected through buffer amplifier 272 to a third input of OR gate 258. The output of gate 258 is connected to the select input of multiplexer 270. Multiplexer 270 has four outputs and is adapted to provide at these outputs (1) the four respective inputs provided from input terminals 220, 222, 224, and 226 when the signal at the set input from OR gate 258 is high, and (2) the four respective inputs provided from input terminals 228, 230, 232, 234 when the signal at the set input from OR gate 258 is low.

The four outputs of multiplexer 270 along with the input terminals 236, 238, 240, and 242 are respectively connected to the eight inputs of multiplexer 274. Input terminals 236, 238, 240, and 242 are also connected to the inputs of NOR gate 276, which in turn has its output connected to an input of AND gate 278. The latter has its output connected to an input of OR gate 252. The input 244 is coupled to the select input of multiplexer 274 and to a second input of AND gate 278. Multiplexer 274 has four outputs connected to output terminals 280, 282, 284 and 286. The four signal outputs of multiplexer 270 are transmitted through multiplexer 274 to the respective output terminals 280, 282, 284, and 286 when the select input from input 254 is low, while the signals at input terminals 236, 238, 240 and 242 are transmitted through multiplexer 274 to the respective output terminals 280, 282, 284, and 286 when the select input is high.

Figure 3:
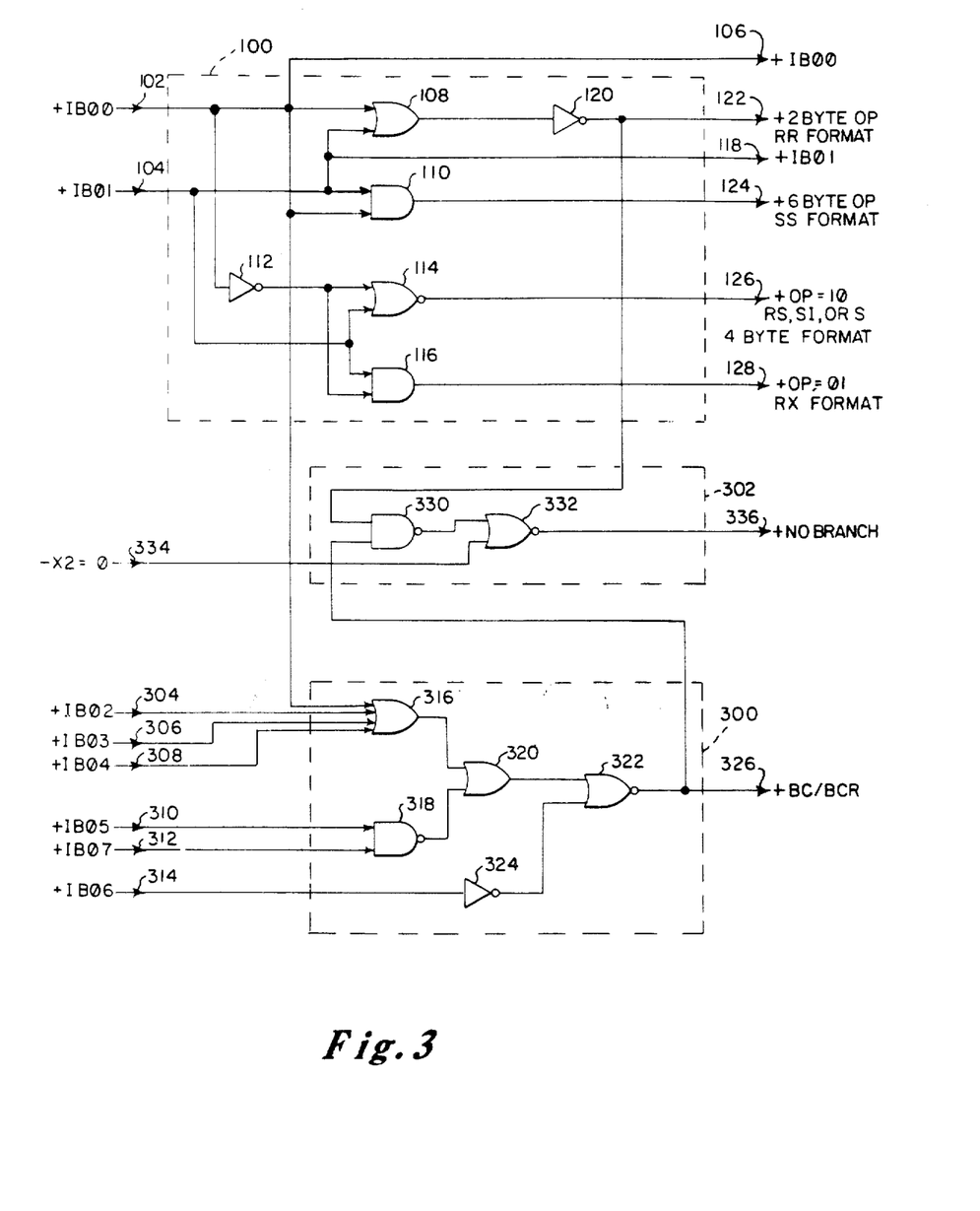
FIG. 3 is a logic diagram of a portion of the preferred embodiment of the register loading control system of the present invention including signal format recognition circuitry and a portion of the circuitry for selectively detecting specific operation codes in response to specific branching instructions.
Figure 6:
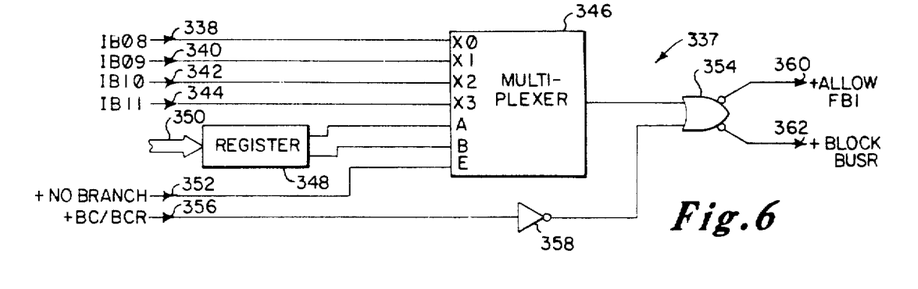
FIG. 6 is a logic diagram of yet another portion of the preferred embodiment of the register loading control system of the present invention including circuitry for testing for condition codes when testing for branching instructions.

The means for controlling branch instructions is shown in FIG. 3 and FIG. 6. Generally, the two types of macrobranch instructions of interest are (1) the BRANCH TYPE 1 signal which is of the RR format and has an operation code of 07, i.e., in binary form 0000 0111; and (2) the BRANCH TYPE 2 signal which is the RX format and having an operational code of 47, i.e., in binary form 0100 0111. The BRANCH TYPE 1 instruction will cause a branch to the address specified by the contents of the R2 field, i.e., bits 13-16, if the binary value of a select bit in the R1 field equals the preselected condition code. However, if the bits in the R2 field are all low then no branch is performed. The BRANCH TYPE 2 instruction will cause a branch to the address specified by the addition of the contents of GP(X2)(bits 13-16)+GP(B2)(bits 17-20)+D2 (bits 21-32) if the select one of the binary values contained in the R1 field equals the condition code. The means for controlling branch instructions preferably includes discriminator 100 of FIG. 3, detector means 300 of FIG. 3 for detecting the 07 and 47 operation codes, means 302 of FIG. 3 for determining whether the R2 field contains all zeros, when the 07 code (RR format) is present and the means 337 in FIG. 6 for testing to see whether the condition code is met.

In FIG. 3 the detector means 300 includes the input terminals 102, 304, 306, 308, 310, 312, and 314, for respectively receiving the first, third, fourth, fifth, sixth, eighth and seventh bits of an instruction. Input terminals 102, 304, 306, and 308 are connected to the four inputs of OR gate 316, while inputs 310 and 312 are connected to the two inputs of NAND gate 318. The outputs of gates 316 and 318 are respectively connected to the two inputs of OR gate 320, which in turn has its output connected to an input of NOR gate 322. The input terminal 314 is connected to the input of inverter 324, which in turn has its output connected to the other input of NOR gate 322. The output of NOR gate 322 is coupled to the output terminal 326 for providing the BC/BCR branching signal and to an input of NAND gate 330 of means 302. The output of inverter 120 of signal discriminator 100 is connected to the other input of NAND gate 330. The output of gate 330 is connected to one input of NOR gate 332. An input terminal 334 for receiving the −X2=0 signal from output terminal 264 of means 200 in FIG. 5, is connected to the other input of NOR gate 332. The output of the latter is coupled to the output terminal 336 for providing the NO BRANCH signal.

Referring to FIG. 6 means 337 includes input terminals 338, 340, 342, and 344 respectively connected to the four data inputs of a 4 to 1 multiplexer 346 for testing for the condition code. Register 348, receiving information over bus 350 from buffer 18, has two outputs connected to the address or condition code A and B inputs of multiplexer 346. The input terminal 352 adapted to receive the NO BRANCH signal from the output terminal 336 of the means 302 of FIG. 3, is connected to the E input of multiplexer 346. Where the input signal to terminal 352 is high, the output of the multiplexer 346 is forced to a low regardless of the other inputs. The output of multiplexer 346 is connected to an input of NOR gate 354. Another input terminal 356 is connected to the input of inverter 358, which in turn has its output connected to the other input of NOR gate 354. The output of NOR gate 354 provides the two output signals FBI and BLOCK BUSR respectively at the output terminals 360 and 362 and buffered from one another.

The operation of control systems 28 and 44 are now described.

In operation discriminator 100 of FIG. 3 receives the first two bits IB00 and IB01 at the respective terminals 102 and 104. If both signals are low, the two inputs to OR gate 108 will be low so that the output of the gate will be low. The output of inverter 120 will therefore be high providing the 2 BYTE OP signal at output terminal 122, indicating that the signal present is of the RR format. Simultaneously, (1) the output signal at each of terminals 106 and 118 will be low, (2) the inputs to AND gate 110 will be low so that the output to inverter 112 will be low and therefore the output of the gate and thus terminal 124 will be low, (3) the input to inverter 112 will be low so that the output of inverter 112 will provide a high input to AND gate 116, although the other input signal of the gate will be low resulting in a low output from gate 128.

If the input at terminal 102 is low but the input at terminal 104 is high, the outputs at terminals 106 and 108 will be low and high respectively. The inputs to OR gate 108 will be low and high resulting in a high output signal. However, the high output is inverted to provide a low signal at output terminal 122. AND gate 110 receives a low and a high signal so that the output of that gate and thus terminal 124 remains a low. The output of inverter 112 remains high so that both inputs of NOR gate 114 are high, and the output of that gate at terminal 126 is low. However, both inputs of AND gate 116 are high so that the output of the gate and thus terminal 128 is high providing the OP=01 signal indicating the RX format is present.

Where the inputs to terminals 102 and 104 are a high and low, respectively, the output at terminal 106 will be high thereby providing the IB00 signal, while the output at terminal 118 will remain low. The output of OR gate 108 will be high which is inverted to low by inverter 120 so as to provide a low output at terminal 122. Only one input to AND gate 110 is high so that the output of the gate and therefore at terminal 124 will be high. Inverter 122 converts the high signal at terminal 102 to a low input of gates 114 and 116. The high signal at the input terminal 104 is applied to the other inputs of gates 114 and 116. Since both inputs of AND gate 116 are low the output at terminal 128 is low. However, with both inputs to NOR gate 114 low, the output of the gate is high so that the OP=01 signal is provided at terminal 126 indicating the signal is of the RS, SI or S format.

Finally, when both input signals at terminals 102 and 104 are high, the outputs at terminals 106 and 118 are each high, thereby providing the signals IB00 and IB01. Both inputs of OR gate 108 are high so that the output of the gate and thus the input to inverter 120 will be high. The output of inverter 120 and thus terminal 122 therefore will be low. The two inputs to AND gate 110 are high so that the output of the gate will be high. The 6 BYTE OP signal is thus provided at the output terminal 124. The high input of terminal 102 is inverted to a low so that one input to each gate 114 and 116 is low and one input is high. This results in the outputs of both gates and thus terminals 126 and 128 being low.

In FIG. 4, the means for quickly controlling the microprogram flow based on data within floating point macroinstructions operates as follows. The operation code (i.e. the first eight bits of information of the instruction) is received at the input terminals 150–164 and simultaneously provided at the output terminals 178–192. As previously described the means 194 for determining the nature of the specification exception must determine whether the signal is of the RX or RR format and whether the floating point instructions provided by the 20–3F operation code (RR format) will cause a specification exception if the wrong floating point register addresses are specified in the R1 and R2 fields. Accordingly, the means 194 receives the OP=01 signal from discriminator 100 at input terminal 166 when the signal is of the RX format, and the 2 BYTE OP signal from discriminator 100 at input terminal 176 when the signal is of the RR format.

Simultaneously, the third bit IB02 (which when high indicates a floating point instruction is present) and the first and last bits of each of the R1 and R2 fields, the ninth, twelfth, thirteenth and sixteenth bits, IB08, IB11, IB12 and IB15 are now applied to the means 194. A specification exception exists if (1) one of the signals IB08 and IB11 in an RX format floating point instruction is high, or (2) if one of the signals IB08, IB11, IB12 and IB15 in an RR format floating point instruction is high. This will be more evident from a description of the means 194.

When a floating point instruction is present, the third bit IB02 will be high, and will be applied to an input of each of the AND gates 196 and 198. Where the floating point instruction is of an RX format the signal at the input terminal 166 will be high, while the input at input 176 will be low. There is no specification exception if both of the IB08 and IB11 signals are low so that the output of NOR gate 200 will be high and AND gate 196 will be high. The output of gate 196 is therefore high so that the output at the terminal 206 is also high. The outputs at terminals 178–192 and 206 provide a unique address in which the signal at terminal 206 indicates that there is no specification exception. If, however, one or both of the IB08 and IB11 signals are high then the output of NOR gate 200 is low so that the output of AND gate 196 will be low. The low output of gates 196 and 198 result in a low output of OR gate 204 at terminal 206. The unique address therefore includes a specification exception by virtue of the fact that the output at terminal 206 is low.

Where the floating point instruction is of an RR format the signal at input 166 is low and the signal at the input 176 is high. Thus, AND gate 196 will be disabled and AND gate 198 will be enabled as the input at terminal 154 is high. If one or more of the inputs at terminals 168, 170, 172 and 174 is high the outputs of one or both of the NOR gates 200 and 202 will be low and AND gate 198 will be disabled. The output at terminal 206 will remain low and the unique address provided at terminals 178-192 and 206 will contain a specification exception. If, however, all of the inputs at terminals 168, 170, 172 and 174 are low, the outputs of both NOR gates 200 and 202 are high and gate 198 is enabled. The output of gate 198 provides a high output signal to gate 204, which in turn provides a high signal to output terminal 206. Thus, if there is no specification exception the output at terminal 206 will be at a high level.

The means 210 (shown in FIG. 5, for quickly determining, during RIF operation, whether the address of a specified general purpose register is all zeros) tests the particular field for each format to determine whether that field contains all low signals in accordance with the loading conditions of Table I in FIG. 1. Where it does not contain all zeros the contents of the general purpose registers whose address appears the specified field is transferred to the A register. Where data is previously provided in the general purpose registers it is typically placed there by the microprogram in the same manner as is accomplished in the prior art IPL System. Thus, the loading of data in the general purpose registers is not considered new and thus has not been described herein in detail to avoid obscuring the description of the present invention.

(A) If the instruction is of the RR format, it is desirable to load the A register with the contents of the general purpose register having the address provided in the R2 field (bits 12-15 or signals IB13-IB16) of the instruction. If the RR format is present, the input at terminal 218 will receive a high signal, while the inputs to terminals 212, 214 and 216 will be low. The high signal at terminal 218 results in a high output of OR gate 258 and thus a high input at the select input of multiplexer 270. The latter sets the multiplexer 270 so that the four outputs of multiplexer 270 will respectively be the same as the four inputs at terminals 220, 222, 224, and 226, i.e., IB12-IB15, and specifically the contents of the R2 field. The input at terminal 244 will remain low so that multiplexer 274 will transmit the four output signals from multiplexer 270 to the respective four output terminals 280, 282, 284 and 286. The output signals IB12-IB15 at terminals 280-286 are the address of the general purpose register which when addressed transfers its contents to the A register as indicated in the table of FIG. 1. If the signals IB12-IB15 at the respective input terminals 220, 222, 224 and 226 are all low, then the output of OR gate 262 and thus the signal at terminal 264, $-X2=0$, will be low and utilized to control the branching instructions as described hereinafter.

(B1) When the input instruction is of the RX format, the OP=01 signal at input terminal 216 is high while the inputs at terminals 212, 214 and 218 are each low. The OP=01 signal at terminal 216 is applied to the enable inputs of decoder 256. As shown in the table of FIG. 1 if all of the bits of the X2 and B2 fields (bits 13-20) are low then the A register is set to all zeros. If bits 13-20, i.e., IB12-IB19, are all low, the inputs at terminals 220-234 are all low. Accordingly, the outputs of OR gates 262 and 266 are each low. While inverter 268 provides a high output, gate 250 remains disabled since the input signals at terminals 212 and 214 are low and thus the output of OR gate 246 is low. The output signal $-X2=0$ is low, while the A and B inputs to the decoder 256 are both low. Accordingly, the phi-2 and phi-3 outputs of the decoder are low, while the phi-0 output and thus an input to OR gate 252 is high. This results in the output signal of gate 252 at output terminal 254 to go high so as to provide the IU CLR A REG signal, clearing the A register to all zeros.

(B2) When the input instruction is of the RX format, the X2 field (IB12-IB15) contains all low signals and the B2 field (IB16-IB19) contains one or more high signals, the A register is to be set to the contents of the general purpose register having the address specified in the B2 field. Specifically, the OP=01 signal at input terminal 216 enables the decoder 256 as previously described. The inputs at terminals 220-226 are all low, while one or more of the inputs at terminals 228-234 is high. The output of OR gate 262 is therefore low, while the output of OR gate 266 is high. Since the A and B inputs of decoder 256 are respectively low and high signals, a low output is provided at each of the phi-0, phi-2 and phi-3 outputs of decoder 256. The phi-0 low signal maintains the output of OR gate 252 low since its remaining inputs are low. The phi-2 and phi-3 low output signals provide a low output from OR gate 258 since the input at terminal 218 is low. The low input signal at the select input of multiplexer 270 results in the inputs at terminals 228-234, i.e., IB16-IB19 being applied to the respective outputs of the multiplexer 270 and to the mutliplexer 274. Similarly, since the instruction is of the RX format, the input signal at terminal 244 and thus the select input of multiplexer 274 is low and the IB16-IB19 outputs of multiplexer 270 are transmitted through multiplexer 274 and provided as the IULSAR01-04 signals at the respective output terminals 280-286. These signals provide the address to the appropriate general purpose register whose contents are loaded into the A register, thus satisfying Table I in FIG. 1.

(B3) When the input instruction is of the RX format, and the X2 field (IB12-IB15) contains one or more high signals, while the B2 field (IB16-IB19) contain all low signals, the A register is set to the contents of the general purpose register having its address specified in the X2 field. Specifically, the OP=01 signal at terminal 216 enables decoder 256 as previously described. One or more inputs at terminal 220-226 will be high so that the output of OR gate 262 is high, while the inputs at terminals 228-234 will be low so that the output of OR gate 266 is low. Although the latter results in a high output of inverter 268, AND gate 250 remains disabled since the inputs at terminals 212 and 214 and thus the output of gate 246 remain low. However, the A and B input signals of decoder 256 are respectively high and low. This results in the phi-2 output of decoder 256 being high, while the remaining outputs are low. The phi-2 high output provides a high input to the select input of multiplexer 270. This in turn results in the signals at terminals 220-226, IB12-IB15, to be transmitted through the mutliplexer 270 to the inputs of multiplexer 274. The input signal at terminal 244 is again low so that the select input to multiplexer 274 remains low and multiplexer 274 provides the IB12-IB15 signals at output terminals 280-286 where they address the particular general purpose register, which in turn transfers its contents to the A register.

(B4) Finally, when the input instruction is of the RX format and the X2 and R2 fields each contain one or more bits that are high, the A register is set to the contents of general purpose register having its address specified in the X2 field. Both outputs of OR gates 262 and 266 will be high. Decoder 256 is again enabled by the high signal at terminal 216. The decoder provides a high output at phi-3 and thus terminal 260, while the phi-0 and phi-2 outputs are both low. The phi-3 output also provides a high signal to OR gate 258, which in turn provides a high signal to the select input of multiplexer 270. As in the previous case (B3) above this results in the IB12-IB15 signals to be transmitted through multiplexer 270 to multiplexer 274. Due to the low signal at the select input of multiplexer 274 the IB12-IB15 are also transmitted through multiplexer 274 to terminals 280-286, where they adress the general purpose register having its address specified in the X2 field. The general purpose register in turn transfers its contents to the A register.

(C) When the input instruction is of the RS or S format, and the bits of the B2 field (IB16-IB19) are all low, then the A register is set to all zeros. If the B2 field contains one or more bits that are high then the A register is set to the contents of the general purpose register having its address specified in the B2 field. Similarly, when the input instruction is of the SI format the A register is set to all zeros, if the bits of the B1 field (IB16-IB19) are all low signals, while the A register is set to the contents of the general purpose register having its address specified in the B1 field when the field contains one or more high signals. Specifically, when an RS, SI or S format instruction is present, the OP=10 signal at input terminal 212 is high, while the signals at terminals 214, 216 and 218 are all low. The high input signal at terminal 212 results in a high output of OR gate 246 and thus a high input to AND gate 250. If the IB16-IB19 signals are all low, the inputs to OR gate 266 are all low (the input from terminal 244 is low since the instruction is not of the SS format). The resulting low output of OR gate 266 provides a high output of inverter 268, thereby enabling AND gate 250 so that the latter provides a high output to OR gate 252. This in turn provides a +IU CLR A REG signal at output terminal 254 so that the A register is cleared. If on the otherhand one or more of the signals IB16-IB19 at terminals 228-234 are high, the output of OR gate 266 will be high, which in turn results in a low output from inverter 268 so that AND gate 250 is disabled. Since the select inputs of multiplexers 270 and 274 are both low (due to the fact that the inputs at terminals 218 and 244 are both low and the phi-2 and phi-3 outputs of decoder 256 are both low), the output of multiplexer 270 will be the IB16-IB19 signals, which will be transmitted through multiplexer 274 to the respective output terminals 280-286. The signals IB16-IB19 at terminals 280-286 are then used to address the general purpose register GP(B1) whose contents are in turn entered into the A register.

(D) When the input instruction is of the SS format the instruction will contain 48 bits of information. However, since the A register is preferably a 32-bit register the instruction is transmitted in two words, the first a 32 bit word, the second a 16 bit word accompanied by the SELECT 2ND WD IULSAR signal at input terminal 244. During the first word if the bit signals of the B1 field, i.e., IB16-IB19 are all low then the A register is set to all zeros. Otherwise the A register is temporarily set to the contents of the general purpose register having an address in the B1 field. During transmission of the second word of the instruction if the B2 field contains all low signals then the A register is set to all zeros. Otherwise, the A register is set with the contents of GP(B2), whose address is provided in the B2 field, i.e., IB32-IB35. When the SS format is present the input signal at input terminal 214 is high for the first 32 bit word, while the input signal at terminal 244 is high for the second bit word. The remaining signals at terminals 212, 216 and 218 are low. For the first word of the SI format the device operates exactly in the same fashion as it does for the SI format, except that a high signal appears at input terminal 214 instead of input terminal 212. Thus, if IB16-IB19 are all low, the AND gate is enabled and the A register is cleared to all zeros. If IB16-IB19 are not all low, they are transmitted through mutliplexers 270 and 274 to output terminals 280-286 and used to address GP(B1) whose contents are temporarily entered into the A register. During the transmission of the second word of the SS format signal a high signal is provided at input terminal 244, which signal is provided to the select input of multiplexer 274. If all of the signals IB32-IB35 of the B2 field are low, the output of NOR gate 276 is high. This latter signal together with the high signal at terminal 244 enables AND gate 278. The latter in turn provides a high signal to gate 252, which in turn provides a clear signal IU CLR A REG signal to the A register so as to set the register to all zeros. Where one or more of the signals IB32-IB35 is at a high level, the output of NOR gate 276 will remain low maintaining AND gate 278 in a disabled condition. However, the high signal from input terminal 244 and applied to the select input of multiplexer 274 results in the multiplexer transmitting the IB32-IB35 signals to the output terminals 280-286 where they can be used by GP(B2), whose contents are transmitted to and entered into the A register.

Finally, referring to FIGS. 3 and 6, when detecting the two macrobranch instructions, as previously described the instructions of interest will have either an 07 (i.e., 0000 0111) or 47 (i.e., 0100 0111) operation code. Since all but the second bits are the same the second bit need not be sensed since the state of IB01 can be either high or low. It is necessary, however, to sense the IB00, IB02, IB03, IB04, IB05, IB06 and IB07 signals. Thus, OR gate 316 of means 200 tests to see if the IB00, IB02, IB03 and IB04 signals are all low, while NAND gate 318 and inverter 324 are used to test whether all of the IB05, IB06 and IB07 signals are high so that the operation code is met. Where IB00, IB02, IB03 and IB04 are all low, the output of OR gate 316 and thus the input to OR gate 320 will be low. Where IB05 and IB07 are both high, then the output of NAND gate 318 will be low. With both inputs of gate 320 low the output of OR gate 320 will be low. If IB06 is high the output of OR gate 320 will be low. If IB06 is high meeting the 07 or 47 operation code condition, the output of inverter 324 is low. Since both inputs of NOR gate 322 are low the output of the gate will be high so as to provide a branching signal BC/BCR at output terminal 326. The branching instruction occurs unless the signal is of the RR format and the R2 field contains all low signals. If the latter condition occurs the 2 BYTE OP signal at output terminal 122 of discriminator 100 will be high so that NAND gate 330 is enabled. The output of gate 330 will therefore be low. If the R2 field are all low, both inputs to NOR gate will be low, enabling the gate so that the NO BRANCH signal at the output terminal 336 will be high. It should be appreciated that if the signal is not of the RR format, or if the R2 field contains one or more high signals, the output signal NO BRANCH at output terminal terminal 336 will be low.

Referring to FIG. 6, the instruction will cause a branch if one of the signals of the address specified by IB08–IB11 equals the preset condition code, unless the NO BRANCH signal is provided. The condition code is set by register 348, which in turn is set by the central processing unit. If the branching condition exists, i.e., the BC/BCR signal provided from terminal 326 of FIG. 3 to terminal 356 of FIG. 6 is high so that the output of inverter 358 will be low. The NO BRANCH signal provided from terminal 336 is low. Thus, depending on what signal IB08, IB09, IB10 or IB11 of the R2 field is transmitted through mutliplexer 346, as determined by the condition code set by register 348, will determine whether the FB1 instruction is followed and the BUSR instruction is blocked. If the signal transmitted through multiplexer 346 is high, the two outputs of gate 354 will be low. At this point the microcode will follow the BUSR operation by issuing a conditional microinstruction which in turn will cause a macroinstruction branch. The low signal at terminal 362 will enable this operation. If, however, the output of multiplexer 346 is low as determined by the IB signal output of the multiplexer set by the operation code (which in turn is set by register 348), or by the NO BRANCH signal provided at the output terminal 336 and applied to input terminal 352 (the latter forcing the output of multiplexer 346 low) then the two outputs of NOR gate 354 will be high, providing the ALLOW FB1 and BLOCK BUSR signals at the respective output terminals 360 and 362. These signals will instruct the microcode to skip the BUSR operation and perform the FB1 operation by skipping to the next sequential macroinstruction. Thus, the hardware provides either an extremely fast macroinstruction branch, or a skip to the next sequential macroinstruction.

The foregoing circuitry provides an improvement over the prior art IPL System by providing a faster control of microprogram flow based on the data within a floating point instruction, a speed up of macroinstruction flow by providing the microprogram with hardware assistance based on data within various fields of the macroinstruction and a speed up of some macroinstruction branches.

Various changes may be made to the preferred embodiment without departing from the present invention. For example, the various aspects have been shown useful in a system processing instructions of at least six different formats. It should be appreciated that the first aspect of the present invention directed to the control of microprogram flow of instructions based on data within a floating point macroinstruction can be used in systems processing instructions of as few as two formats containing (i) an operation code of at least two binary bits of information, the binary state of at least one of which indicates the instruction is a floating point instruction, and (ii) at least one field of at least two binary bits of information the binary states of which determine whether a specification exception exists in the instruction. The second aspect of the present invention directed to the speed up of macroinstruction flow as a function of data within various fields of the macroinstruction can be used in systems processing instructions in as few as four formats, with (1) each format of the type comprising an operation code including at least two binary bits for defining the format, and (2) three of the formats each comprise at least one field of at least two bits and the fourth format comprises at least two fields each of at least two bits of data. The third aspect of the present invention directed to the speed up of macroinstruction branches can be responsive to at least one instruction comprising (1) an operation code of a plurality of bits, each bit being at a predetermined level, and (2) at least one field of data comprising a plurality of bits, at least one of the bits matching a preset condition code when at a preselected binary level.

Since certain changes may be made in the above apparatus without departing from the scope of the invention herein involved, it is intended that all matter contained in the above description or shown in the accompanying drawing shall be interpreted in an illustrative and not limiting sense.

What is claimed is:

1. A system for generating a specification error signal in response to a predetermined type of instruction in at least one preselected format containing: (i) an operation code of at least two binary bits of information, the binary state of at least one bit indicating said instruction is of said predetermined type, and (ii) at least one field of at least two binary bits of information the binary states of said two bits determining whether a specification exception exists in said instruction, said system comprising, in combination:

discriminator means for generating a first enabling signal in response to said instruction when said instruction is in said preselected format, said discriminator means comprising: (1) means for detecting and discriminating between instructions in said preselected format and instructions in other formats, and (2) means for generating said first enabling signal when said instructions are in said preselected format;

means for generating a second enabling signal in response to the binary state of said one bit of said operation code indicating said instruction is of said predetermined type; and means for generating said specification exception signal in response to (a) said first enabling signal, (b) said second enabling signal, and (c) a predetermined binary state of each of said bits of said field of said instruction.

2. a system according to claim 1, wherein said system includes means for generating said specification error signal in response to instructions of said predetermined type in at least two preselected formats, one of said preselected formats of said instruction including an operation code and at least one of said fields, and the other of said preselected formats of said instruction including an operation code and at least two of said fields, and further wherein: (1) said discriminator means generates said first enabling signal in response to said instruction when said instruction is in either of said two preselected formats and said means for detecting discriminates between instructions of said two preselected formats and instructions of other formats, and (2) said means for generating said specification exception signal generates said specification exception signal responsively to: (a) said first enabling signal, (b) said second enabling signal, and (c) a predetermined binary state of each of said bits of said one field of instruction when said instruction is in said one preselected format and a predetermined binary state of each of said bits of each of said two fields when said instruction is in said other preselected format.

3. A system according to claim 2, wherein the format of each said instruction is a function of the binary states of each of said two bits of said operation code of said instruction and said discriminator means includes a pair of input terminals for receiving said two bits of said operation code of each said instruction, means coupled to said pair of input terminals for detecting the binary state of each of said two bits, and means responsive to said two states for generating said first enabling signal when said instruction is in said one preselected format and said first enabling signal when said instruction is in said other preselected format.

4. A system according to claim 3, wherein said means for generating said specification exception signal includes means responsive to said one first enabling signal, said second enabling signal and said predetermined binary state of select bits of said one field when said instruction is in said one preselected format, and means responsive to said another first enabling signnal, said another enabling signal and said predetermined binary state of select bits of each of said two fields when said instruction is in said other preselected format.

5. A system for generating a plurality of binary bits of data adapted to be used for controlling the flow of information to a register, said plurality of bits of data being contained within at least one field of an instruction in at least four different formats and said register being cleared when the binary states of the bits of data within said field in at least some of said formats are each at a corresponding predetermined level, wherein: (a) an instruction in each of said formats is of the type comprising an operation code including at least two binary bits of information, the combined binary states of the two bits being a function of the format of said instruction, and (b) the instructions of three of said formats each comprises at least one field of at least two binary bits of data and an instruction in the fourth of said formats comprises at least two fields each of at least two bits of data, said system comprising, in combination:

signal discriminator means responsive to said two bits of information of the operation code of an instruction for selectively generating at least four distinct format signals each as a function of a different combination of the binary states of the two bits of information of said operation code so as to represent a select and different one of said formats;

multiplexer means for transmitting:
  (1) said plurality of bits of data within said one field of an instruction in a first one of said three formats in response to a first one of said format signals representative of one of said three formats;
  (2) said plurality of bits of data within said first of said two fields of an instruction in said fourth format in response to either one of a first select signal and a second select signal;
  (3) said plurality of bits of data within the second of said two fields of an instruction in said fourth format in response to the absence of each of said first format signals, said first select signal and said second select signal;
  (4) said plurality of bits of data within said one field of an instruction in the second one of said three formats in response to the absence of each of the first format signal, first select signal and second select signal; and
  (5) said plurality of bits of data within the one field of an instruction in the third one of said three formats in response to the absence of each of said first format signals, first select signal and second select signal;

decoding means responsive to the fourth format signal representative of an instruction in the fourth format for generating:
  (1) a first clear signal for clearing said register when the bits of said data of each of said first and second fields of an instruction in the fourth format are each at said corresponding predetermined level,
  (2) said first select signal when only the bits of said data of said first field of an instruction in said fourth format are each at said corresponding predetermined level; and
  (3) said second select signal when at least one of the bits of said data of each of said first and second fields of an instruction in the fourth format differ from the corresponding predetermined level;

means responsive to the second format signal for generating a second clear signal so as to clear said register when the bits of said data of said one field of an instruction in said second format are each at said corresponding predetermined level; and means responsive to the third format signal for generating a third clear signal so as to clear said register when the bits of said data of said one field of an instruction in said third format are each at said corresponding predetermined level.

6. A system according to claim 5, wherein an instruction in said third format includes a third select signal and a second field of at least two bits of data, said system further including second multiplexer means coupled between said first multiplexer means and said register for transmitting:
  (1) said plurality of bits of said data within said second field of an instruction in said third format in response to said third select signal, and
  (2) the output of said first multiplexer means in response to the absence of said third select signal.

7. A system according to claim 6, further including means responsive to said third format signal for generating a fourth clear signal so as to clear said register when the bits of said data of said second field of an instruction in said third format are each at a corresponding predetermined level.

8. A system according to claim 7, wherein an instruction in said third format includes two binary bit words transmitted sequentially with respect to one another, the first of said words containing the operation code and said first field, and the second of said words including said second field, said system further comprising means for preventing the generation of said third clear signal in response to said second word.

9. A system for generating an instruction initiation signal for initiating a first instruction operation and for blocking a second instruction operation in response to at least one instruction comprising: (1) an operation code of a plurality of binary bits of information, each bit being at a predetermined binary level, and (2) at least one field of data comprising a plurality of binary bits, at least one of said bits providing a condition code when at a preselected binary level, said system comprising:

means for generating an enabling signal in response to said operation code when said plurality of binary bits of said operation code are each at its predetermined binary level;

means for generating a condition code input signal representative of the select one of said binary bits of said field;

multiplexer means responsive to said condition code input signal for selectively transmitting said select one of said binary bits, and means for generating said instruction initiation signal for initiating said first instruction operation and for blocking said second instruction operation in response to: (a) said enabling signal, and (b) said select one of said binary bits when said select one is at said preselected binary level.

10. A system according to claim 9, wherein said system includes means for generating said initiation signal in response to instructions of at least two different formats, each said instruction comprising said operation code and said one field, and further including means for generating a disabling signal when the plurality of bits of said field of an instruction of one format are each at a preselected binary level, wherein said multiplexer means is responsive to said disabling signal so as to prevent said select one of said binary bits from being transmitted.

11. A system according to claim 10, wherein each format of said instruction is defined by the binary state of at least one bit of said operation code, said means for generating said disabling signal includes means for detecting each of said plurality of bits of said field and for generating a first signal when said plurality of bits of said field are each at said preselected level, and means for detecting said one bit of said operation code and for generating a second signal when said instruction is in said one format.

* * * * *

UNITED STATES PATENT AND TRADEMARK OFFICE
CERTIFICATE OF CORRECTION

PATENT NO. : 4,488,224
DATED : December 11, 1984
INVENTOR(S) : Stephen J. Ippolito et al It is certified that error appears in the above-identified patent and that said Letters Patent is hereby corrected as shown below:

Claim 1, column 18, line 37, after "to", insert -- : --;

Claim 2, column 18, line 41, please delete "a" and substitute therefor -- A --;

Claim 4, column 19, line 14, please delete "signnal" and substitute therefor -- signal --; and Claim 10, column 21, line 11, before "initiation", insert -- instruction --.

Signed and Sealed this

Second Day of July 1985

[SEAL]

Attest:

DONALD J. QUIGG

Attesting Officer          Acting Commissioner of Patents and Trademarks